(No Model.) 2 Sheets—Sheet 1.
P. MERRILL.
WHEEL FOR VEHICLES.
No. 469,708. Patented Mar. 1, 1892.
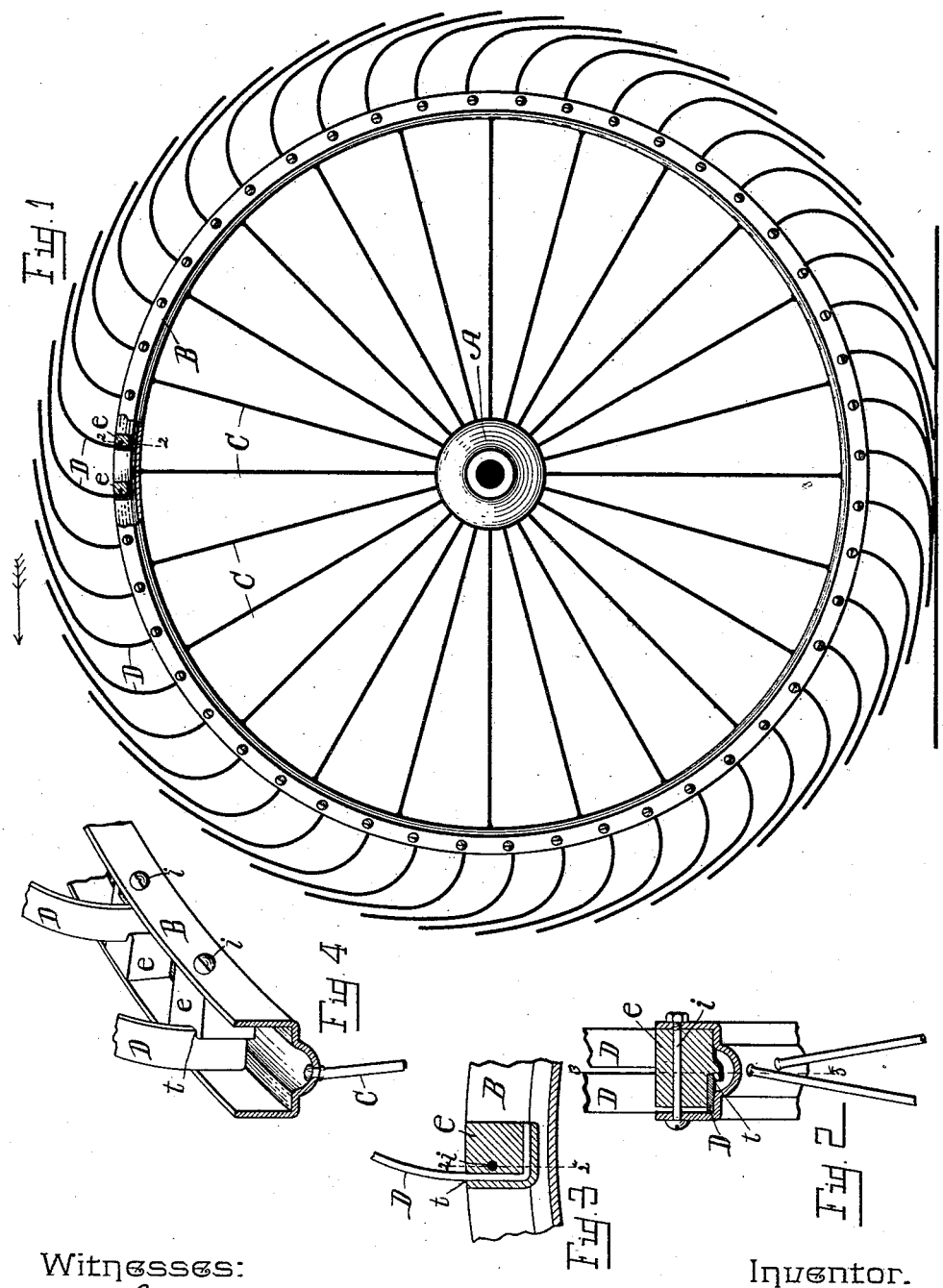
Witnesses:
Dorr E. Wood
Evalena Hawman
Inventor.
Parker Merrill.
By W. E. Wood
Att'y.

(No Model.) 2 Sheets—Sheet 2.
P. MERRILL.
WHEEL FOR VEHICLES.
No. 469,708. Patented Mar. 1, 1892.
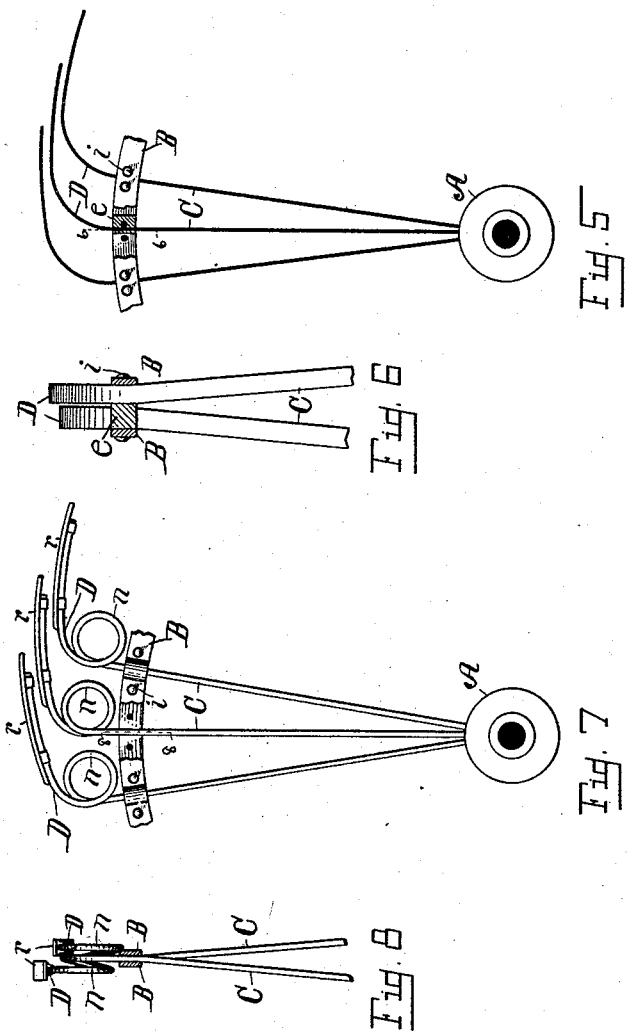
Witnesses:
Dorr E. Wood
Evalena Hawman
Inventor.
Parker Merrill.
By W. S. Wood
Att'y.

UNITED STATES PATENT OFFICE.

PARKER MERRILL, OF ST. LOUIS, ASSIGNOR OF ONE-HALF TO WALTER S. WOOD, OF KALAMAZOO, MICHIGAN.

WHEEL FOR VEHICLES.

SPECIFICATION forming part of Letters Patent No. 469,708, dated March 1, 1892.

Application filed September 7, 1891. Serial No. 404,941. (No model.)

*To all whom it may concern:*

Be it known that I, PARKER MERRILL, a citizen of the United States, residing at St. Louis, county of Gratiot, State of Michigan, have invented new and useful Improvements in Wheels for Vehicles, of which the following is a specification.

My invention relates to wheels for vehicles, and although the accompanying drawings illustrate more particularly those for bicycles, velocipedes, baby-cabs, &c., it may be equally applicable to carriage and wagon wheels or those designed for heavy burden when constructed with reference to their particular requirements.

The object of my invention is to provide a vehicle-wheel which shall have a rigid central portion and an outer elastic or flexible portion constructed with a series of independent springs in such a manner that said springs shall form the outer periphery and tread of the wheel and shall operate in conjunction with each other, so as to make such tread practically continuous, in which the jolts or jars and constant vibrations of the wheel in passing over rough or stony roads and pavements (as experienced in wheels of ordinary rigid construction) is reduced to a minimum.

I attain the objects of my invention by means of the mechanism illustrated in the accompanying drawings, which form a part of this specification, in which—

Figure 1 is a side elevation of a vehicle-wheel, partly in section, with a portion of the rim broken away, constructed in accordance with my invention. Fig. 2 is an enlarged cross-section of the rim on line 2 2 of Fig. 1 looking from a point at the right, also on the same line in Fig. 3. Fig. 3 is a longitudinal section of a broken portion of the rim on line 3 3 of Fig. 2. Fig. 4 is a perspective view showing a section of the rim and other detail parts more fully described below. Fig. 5 is a modification of construction to be hereinafter explained. Fig. 6 is a cross-section on line 6 6 of Fig. 5, looking from a point at the left. Fig. 7 is still another modification, which will be fully described below. Fig. 8 is a cross-section on line 8 8 of Fig. 7, looking from a point at the left.

Similar letters of reference indicate corresponding parts throughout the several views.

Referring to the lettered parts of the drawings, A represents the hub, B the rim, and C the spokes, which may be assembled in any suitable manner to form the rigid center portion of the wheel.

D represents a series of springs around rim B, the contour of which approximates that of an epicycloidal curve, which curve is in the direction around the wheel opposite to that in which it is intended to revolve when rolling upon the ground, one end of said spring being rigidly secured to rim B while the other end is left free, and forms the outer periphery or tread of the wheel. The rim B is preferably formed of sheet-steel or other suitable material having an annular channel at its periphery, into which the springs D are secured alternately with each other at opposite sides thereof, the channel of said rim being sufficiently wide to allow the free ends of said springs to pass by each other or work side and side without contacting when thus clamped, all of which is shown in Figs. 2 and 4.

By referring to Figs. 1 and 3 it is shown that the end of springs D, which is secured to rim B, has an approximately right-angled turn from the outwardly-extending portion thereof, which rests upon the bottom of the channel of said rim. One edge of said spring also engages the hook or groove *t* on the two sides of the clamping-block *e*, nearly midway between the two ends thereof, which block fits the channel of said rim, and by means of the clamping-bolt *i* I am enabled to firmly clamp and hold springs D in position by one edge of said spring engaging one of the side walls of said rim and the other engaging the groove of said block, all of which is clearly shown in Figs. 2, 3, and 4.

By referring to Figs. 2 and 4 it will be noticed that there are only two rows of springs used in this construction, and are placed alternately at opposite sides of the rim B, which is sufficient to clearly show the manner of arranging the springs on said rim. It will be apparent, however, that the number of rows of springs employed are not limited; but any number of rows may be used which shall best suit the requirements of the wheel; but they should be so arranged and secured to the rim that the springs of one row should alternate in position with those of the adjoining row in such a manner that no two adjoining springs shall occupy the same plane transversely across the periphery or rim of the central portion. It will be also apparent that it is not necessary that the rim or periphery of the central portion be provided with a channel for the purpose of receiving the springs, as other suitable means of securing the springs to the rim or periphery of the central portion of the wheel may be employed.

In Figs. 5 and 6 is shown a modification in which the material used for the spring may be also made to form the spoke, thus making the spoke C and spring D one continuous piece, while the rim B is formed of two pieces clamped to each side of the spoke portion by means of the clamping-block e and bolts or rivets i, thus making a wheel of simple and easy construction.

In Figs. 7 and 8 is also shown another modification in which the spring and spoke are formed of one continuous piece, but is provided with the coil n outside of the rim for the purpose of making the spring more elastic in its action. In this construction the free end of the spring is provided with a shoe r, which forms the tread of the wheel. It will be noticed that the coils n are turned from the center or spoke portion outward alternately, thus forming the necessary offset to allow the free ends of the springs carrying the shoes r to pass by each other, while the spoke portions are in line with each other around the rim B, which is composed of two pieces being bolted or riveted together around said spokes, as shown in Figs. 7 and 8.

It will be apparent that a spring constructed in accordance with Figs. 7 and 8 may be used in lieu of the spring shown in Figs. 1, 2, 3, and 4, either with or without the shoe r, and in many instances this style of spring may be preferable.

Shoe r or the free ends of the springs, when used without the shoe, may be provided with a covering of rubber or other suitable material for the purpose of preventing noise on wheels used for bicycles, baby-cabs, &c.

It is also apparent that the particular contour or convolutions of the springs employed, together with the manner of applying the same, may be modified quite indefinitely without adding to or taking from the essential functions of my invention, which were previously stated as its objects.

I am aware that wheels for vehicles have been constructed having certain elastic properties or functions which were retained between the tire or rim and hub of the wheel, either by constructing them with spring-spokes, or springs interposed between the spokes and rim or tire or equivalent devices, all of which, while they may be operative, are objectionable for the reason that wheels thus constructed, when in operation, all their parts are subject to constant change, which necessitates the undue working and straining of all joints and parts, causing them to become loose and soon worn out, thus impairing the durability and efficiency of the wheel.

While a wheel constructed in accordance with my invention will have the essential features of a rigid non-elastic central portion, with the elastic portion or properties very properly placed at the periphery where it will relieve the whole wheel of all jars and vibrations by the combined independent action of the springs, in which a limited number of them are brought into action at one time, depending always upon the weight under which they are placed, the others being relieved, as shown in Fig. 1, where a wheel is shown as rolling on a plane surface under an ordinary load in the direction indicated by the arrow at the top.

It will be also noticed that in my construction the springs are so arranged and shaped that when moving under a load their free ends are sprung in toward the rim and coincide with the true or working periphery of the wheel, and that the springs do not come in contact with the plane upon which they are rolling until the spring is nearly under the center of gravity. Thus it is that the spring resistance is used in sustaining the load and not in retarding the movement of the wheel, and that the springs, after passing the center of gravity, exert a force against the plane over which they are passing to force the wheel ahead, thus making a wheel that is not only easy riding, but easy propelling as well.

Having thus fully described and set forth the advantages of my invention, what I claim as new, and desire to secure by Letters Patent of the United States, is—

1. In a wheel for vehicles, a rigid central portion comprising the hub, spokes, and rim, a suitable number of separate independent springs arranged around the rim of the central portion, one end of said springs being rigidly secured thereto alternately at opposite sides thereof, the free ends of said springs being adapted to work in conjunction with each other to form a practically continuous tread of the wheel, substantially as shown and specified.

2. In a wheel for vehicles, having a rigid central portion, a series of springs arranged around the periphery thereof, one end of said springs being rigidly secured thereto alternately at opposite sides thereof, the contour of said springs being such as to allow them to approach the plane over which they are passing at or near the center of gravity before exerting any resistance to sustain the load or retard the forward movement of the wheel while the outward extremity of the free end of said springs, after passing the center of gravity, exert a force against the plane over which it is passing to move the wheel ahead, substatially as shown and described.

3. In a wheel for vehicles, having a rigid central portion, a series of separate independent springs arranged around the periphery thereof, one end of said springs being rigidly attached thereto and provided with a coil turned outwardly from and between the point of securing and the free end thereof, substantially as shown, and for the purpose specified.

4. In a wheel for vehicles, a rigid central portion having a rim with the annular channel at its periphery, a series of springs arranged around said rim and secured in said channel alternately at opposite sides thereof, said springs being adapted to form the outer elastic portion and tread of the wheel, substantially as shown and described.

5. In a wheel for vehicles, the combination of the channeled rim, of the springs having a right-angled turn from the outwardly-extending portion thereof adapted to engage with the bottom of said channel, of the clamping-block provided with the hook or groove to engage the edge of said spring and the clamping-bolts, substantially as shown and specified.

6. In a wheel for vehicles, the combination of the hub, the spokes attached thereto and extending outward through a rim and having a single coil near the point where the rim attaches thereto, a free end curved outward in a direction around the wheel and provided with a shoe for the purpose of forming the tread of the wheel, substantially as shown, and for the purpose specified.

7. In a wheel for vehicles, having a rigid central portion, a series of springs arranged around the periphery or rim of said central portion, one end of said springs being rigidly attached thereto and provided with a coil between the point of securing and the free end, said free end being provided with a shoe adapted to receive, and provided with a covering of rubber or other suitable material, for the purpose substantially as specified.

8. In a wheel for vehicles, having a rigid central portion, a series of springs arranged around the periphery or rim of said central portion, one end of said springs being rigidly attached thereto, the free end curved outwardly in the direction around the central portion to form the outer periphery and tread of the wheel and adapted to receive and provided with a covering of rubber or other suitable material, for the purpose substantially as specified.

9. In a wheel for vehicles, having a rigid central portion, springs curved outwardly from and in the direction of the periphery of the wheel and arranged around the periphery of said central portion and secured thereto in such a manner that said springs shall operate independently and in conjunction with each other to form the outer periphery and tread of the wheel, substantially as specified.

10. In a wheel for vehicles, having a rigid central portion, an outer elastic portion composed of a series of separate independent springs arranged in rows spaced transversely across and extending around the periphery of the central portion, the springs of one row alternating in position with those of the adjoining row in such a manner that no two adjoining springs shall be secured and occupy the same plane transversely across the periphery of the central portion, said springs forming the outer periphery and tread of the wheel, substantially as specified.

In testimony of the foregoing I have hereunto subscribed my name in presence of two subscribing witnesses.

PARKER MERRILL.

Witnesses:
W. A. FORBES,
W. R. TAYLOR.